United States Patent
Lee et al.

(10) Patent No.: US 8,040,964 B2
(45) Date of Patent: Oct. 18, 2011

(54) APPARATUS FOR RECEIVING T-DMB SIGNAL AND METHOD OF OPERATING THE SAME

(75) Inventors: Hwang-Soo Lee, Daejeon (KR);
Moo-Hong Lee, Daejeon (KR);
Jeong-Han Jeong, Daejeon (KR);
Byung-Jik Keum, Daejeon (KR);
Young-Serk Shim, Seoul (KR)

(73) Assignee: Korea Advanced Institute of Science and Technology (KR)

( * ) Notice: Subject to any disclaimer, the term of this patent is extended or adjusted under 35 U.S.C. 154(b) by 485 days.

(21) Appl. No.: 12/337,279

(22) Filed: Dec. 17, 2008

(65) Prior Publication Data

US 2010/0150181 A1    Jun. 17, 2010

(30) Foreign Application Priority Data

Dec. 16, 2008    (KR) .................. 10-2008-0127823

(51) Int. Cl.
*H04K 1/10* (2006.01)
(52) U.S. Cl. ..................................... 375/260
(58) Field of Classification Search .......... 375/260, 375/362, 365
See application file for complete search history.

(56) References Cited

U.S. PATENT DOCUMENTS

| | | | | |
|---|---|---|---|---|
| 6,058,101 | A  * | 5/2000 | Huang et al. | 370/208 |
| 6,591,092 | B1 * | 7/2003 | Tsuruoka | 455/232.1 |
| 2005/0232136 | A1* | 10/2005 | Kwak | 370/208 |
| 2008/0165674 | A1* | 7/2008 | Lee et al. | 370/210 |
| 2009/0129493 | A1* | 5/2009 | Zhang et al. | 375/260 |

* cited by examiner

*Primary Examiner* — Kevin Kim
(74) *Attorney, Agent, or Firm* — The Belles Group, P.C.

(57) ABSTRACT

There is provided an apparatus for receiving a T-DMB signal. The apparatus for receiving a T-DMB signal comprises an input buffer receiving and buffering a T-DMB signal comprising a null symbol and a phase reference symbol (PRS); an initial synchronizing unit estimating and compensating for time and frequency offsets of the T-DMB signal using the null symbol and the PRS; a frame tracking unit performing estimation of the time offset and measurement of a strength of an output signal from the input buffer; an OFDM signal demodulating unit performing I/Q demodulation, frequency compensation, OFDM demodulation and de-interleaving with respect to an output signal of the frame tracking unit; a channel decoding unit performing channel decoding with respect to an output signal of the OFDM signal demodulating unit and checking quality of the channel-decoded signal; and a controller controlling operations of the initial synchronizing unit, the OFDM signal demodulating unit and the channel decoding unit 308 based on the strength of the signal measured by the frame tracking unit and the quality of the signal checked by the channel decoding unit. Accordingly, unnecessary calculating processes are reduced by measuring the strength and quality of an input signal, thereby maximizing power efficiency of the apparatus.

6 Claims, 6 Drawing Sheets

APPARATUS FOR RECEIVING T-DMB SIGNAL AND METHOD OF OPERATING THE SAME

CROSS-REFERENCE TO RELATED APPLICATION

The present application claims priority under 35 U.S.C. §119(a) to Korean Patent Application No. 2008-0127823, filed on Dec. 16, 2008, the disclosure of which is hereby incorporated herein by reference in its entirely as if set forth fully herein.

BACKGROUND OF INVENTION

1. Field of the Invention

The present invention relates to an apparatus for receiving a T-DMB signal

2. Description of the Related Art

FIG. 1 is a view showing the structure of a transmission frame used in a T-DMB system. The transmission frame 100 comprises a synchronization channel 101, a fast information channel 102 and a main service channel 103. The synchronization channel comprises a null symbol 104 and a phase reference symbol (PRS) 105, and is used for time and frequency synchronization at the receiver side. The fast information channel 102 carries control information for data decoding of the main service channel. The main service channel 103 is a channel containing real video, audio and data information.

FIG. 2 is a block diagram showing the structure of a conventional software-based T-DMB receiver. The receiver 200 comprises an RF tuner 201, an analog-to-digital converter (ADC) 202 and a baseband signal processing unit 203.

The RF tuner 201 amplifies an input signal having a small amplitude and converts a RF frequency into an intermediate or baseband frequency. Further, the RF tuner 201 selects a desired channel through a filter.

The ADC 202 converts analog signals into digital signals.

The baseband signal processing unit 203 comprises an initial synchronizing unit 205 and a data demodulating unit 206.

The initial synchronizing unit 205 comprises a frame synchronizer (205-1), a symbol time synchronizer (205-2) and a frequency synchronizer (205-3). The initial synchronizing unit 205 estimates time and frequency offsets using a null symbol and a PRS and compensates for the estimated time and frequency offsets. The time and frequency offsets estimated through an initial synchronizing process are used for time offset tracking and frequency estimation and compensation together with data demodulation.

The data demodulating unit 206 comprises a time offset tracker 207, an I/Q demodulator (210), a frequency compensator (211), a fractional frequency synchronizer (212), an ODFM demodulator (213), a de-intetleaver (209), a convolution decoder (214), an RS sync byte checker (215) and an RS decoder (216). The data demodulating unit 206 performs I/Q demodulation and OFDM signal modulation, and performs a channel decoding process.

When the receiver 200 is turned on, the initial synchronizing unit 205 is first starts operating. The initial synchronizing unit 205 estimates and compensate for time and frequency offsets using some initial data stored in an input buffer 204. After the initial synchronization is performed, the initial synchronizing unit 205 stops operation, and the data demodulating unit 206 starts operation. If the receiver enters into a tunnel or a shadow area between high-rise buildings, the strength of an input signal received by the receiver is considerably decreased. The RF tuner 201 transmits a received signal strength indication (RSSI) as a level of a received signal to a controller.

If the strength of the input signal is decreased lower than sensitivity, data demodulation is not smoothly performed. However, time and frequency synchronization is generally performed even at the strength of an input signal, where data demodulation is not smoothly performed.

The time offset tracker 207 tracks multiple paths of each frame using a PRS and selects a path along which an input signal is strongest. However, when the receiver enters into a place such as a long tunnel provided with no repeater, the strength of an input signal is extremely decreased. At this time, it is difficult to properly estimate time and frequency offsets any more and loose synchronization. In this case, a controller 208 stops the operation of the data demodulating unit 206 and re-operates the initial synchronizing unit 205 so as to perform time and frequency synchronization.

If the strength of the input signal is maintained lower than reference sensitivity, an initial synchronization process is repeatedly performed until the time and frequency offsets are properly estimated. Therefore, if a receiver receives T-DMB broadcasting while a user moves in a place such as a metropolis having many shadow areas, the aforementioned situation frequently occurs. If the receiver frequently enters into shadow areas, time and frequency synchronization is performed but data demodulation is not properly performed as the strength of an input signal becomes weak. If a data seriously damaged due to the weak strength of input signal is inputted, the damaged data has an influence on subsequent frames due to characteristics of the de-interleaver 209 included in the T-DMB receiver. Although the data demodulating unit 206 is operated for data processing, images or sounds are interrupted as a bad result, and therefore, power is wasted. Further, if the initial synchronizing unit 205 is re-operated as the strength of the input signal becomes weaker, the initial synchronization process is continuously repeated, and therefore, power is also wasted. Furthermore, a large amount of calculation is necessary for the channel decoding process and the operation of the initial synchronizing unit 205. For this reason, if the large amount of calculation is not controlled, power consumption is serious.

SUMMARY OF THE INVENTION

The present invention is conceived to solve the aforementioned problems. Accordingly, the present invention provides an apparatus for receiving a T-DMB signal, which can minimize power consumption even when smooth reception is impossible due to the software-based T-DMB receiver positioned in a shadow area.

The present invention also provides an apparatus for receiving a T-DMB signal, which has low power consumption even when the intensity of an input signal is very low According to an aspect of the present invention, there is provided an apparatus for receiving a T-DMB signal, which comprises an input buffer receiving and buffering a T-DMB signal comprising a null symbol and a phase reference symbol (PRS); an initial synchronizing unit estimating and compensating for time and frequency offsets of the T-DMB signal using the null symbol and the PRS; a frame tracking unit performing estimation of the time offset and measurement of a strength of an output signal from the input buffer; an OFDM signal demodulating unit performing I/Q demodulation, frequency compensation, OFDM demodulation and de-interleaving with respect to an output signal of the frame tracking unit; a channel decoding unit performing channel decoding with respect to an output signal of the OFDM signal demodulating unit and determining quality of the channel-decoded signal; and a controller controlling operations of each of the initial synchronizing unit, the OFDM signal demodulating unit and the channel decoding unit based on the strength of the signal measured by the frame tracking unit and the quality of the signal determined by the channel decoding unit.

The frame tracking unit may measure the strength of the signal using a strength ratio of the null symbol and the PRS.

The channel decoding unit may determines the quality of the channel-decoded signal using RS sync bytes and CRC of a package or audio signal.

The controller may determine operations of each of the initial synchronizing unit, the OFDM signal demodulating unit and the channel decoding unit by comparing the strength of the signal measured by the frame tracking unit with predetermined first and second reference values.

According to another aspect of the present invention, there is provided a method of operating an apparatus for receiving a T-DMB signal, which comprises receiving and buffering a T-DMB signal comprising a null symbol and a PRS; estimating and compensating for time and frequency offsets of the T-DMB signal using the null symbol and the PRS; measuring the time offset and a signal strength of the T-DMB signal, which is varying with time, using the T-DMB signal having the compensated time and frequency offsets; performing OFDM, signal demodulation and channel decoding with respect to the T-DMB signal and measuring quality of the channel-decoded signal when the strength of the T-DMB signal is greater than a predetermined first reference value or when the strength of the T-DMB signal is smaller than the first reference value due to deep fading; performing OFDM signal demodulation and channel decoding and measuring quality of the channel-decoded signal when the quality of all of the predetermined numbers of previous frames of the T-DMB signal are determined to be "good" and the strength of the T-DMB signal is greater than a predetermined second reference value; performing OFDM signal demodulation when the quality of some of the predetermined numbers of previous frames of the T-DMB signal having predetermined numbers is determined to be "bad" and the strength of the T-DMB signal is greater than a predetermined second reference value; and estimating the time offset of the T-DMB signal and measuring the strength of the T-DMB signal when the strength of the T-DMB signal is smaller than the second reference value.

Accordingly, operating processes are changed depending on the strength and quality of signal inputted using the aforementioned method, so that unnecessary calculating processes can be reduced and power efficiency of the apparatus can be maximized.

The method of operating an apparatus for receiving a T-DMB signal can be performed in a computer, and computer program for performing the respective operations in the method is recorded in a computer-readable recoding medium.

According to the present invention, when a signal lower than sensitivity is inputted due to a software-based T-DMB receiver positioned in a tunnel or a shadow area between high-rise buildings, the receiver dose not perform unnecessary processes, thereby saving power consumption.

Further, the power consumption of the receiver can be considerably saved even at a place such as a metropolis having many shadow areas or an area at which the strength of an input signal is not high.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Figure 1:
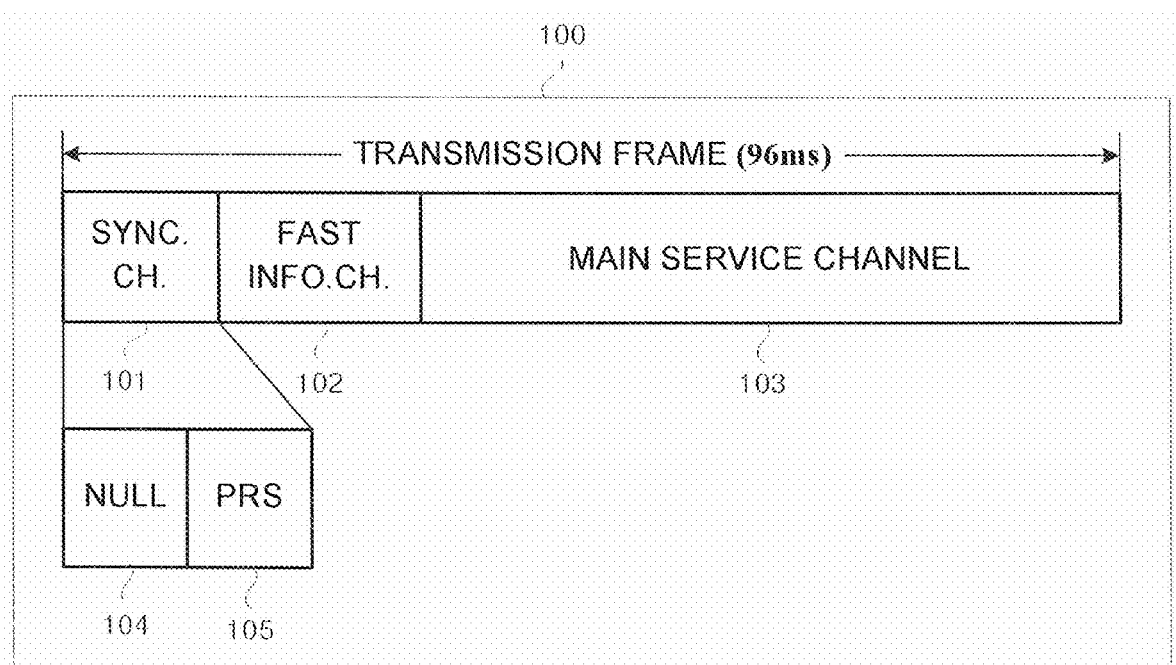
FIG. 1 is a view showing the structure of a transmission frame in a T-DMB system.
Figure 2:
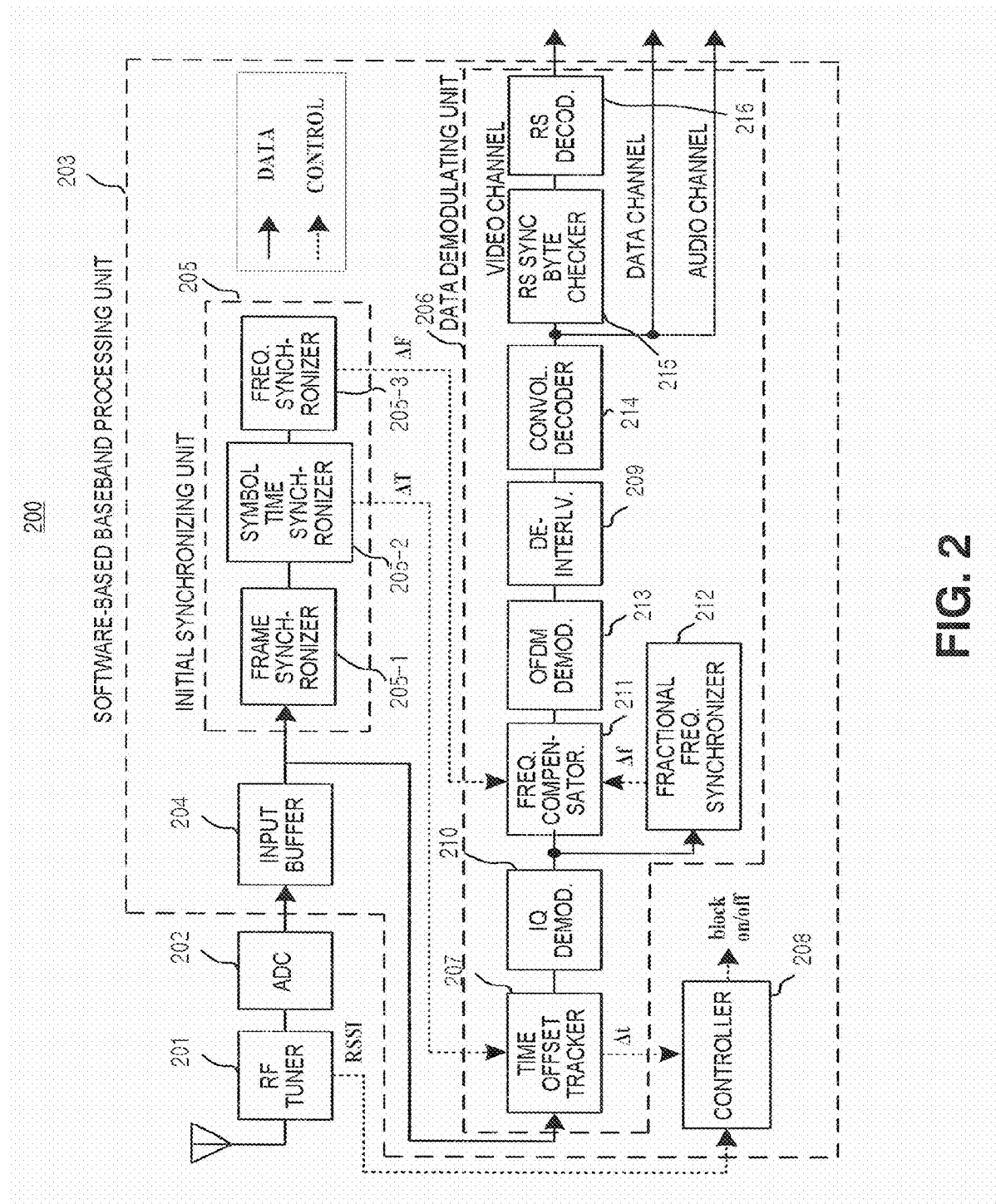
FIG. 2 a block diagram showing the structure of a conventional software-based T-DMB receiver.

Hereinafter, exemplary embodiments of the present invention will be described in detail with reference to the accompanying drawings. Throughout the drawings, like elements arc designated by like reference numerals. Further, detailed descriptions of components which can be readily understood by those skilled in the art will be omitted. Nevertheless, those skilled in the art have no difficulty in understanding the operation of a T-DMB receiver according to the present invention and the technical spirit of the present invention.

Figure 3:
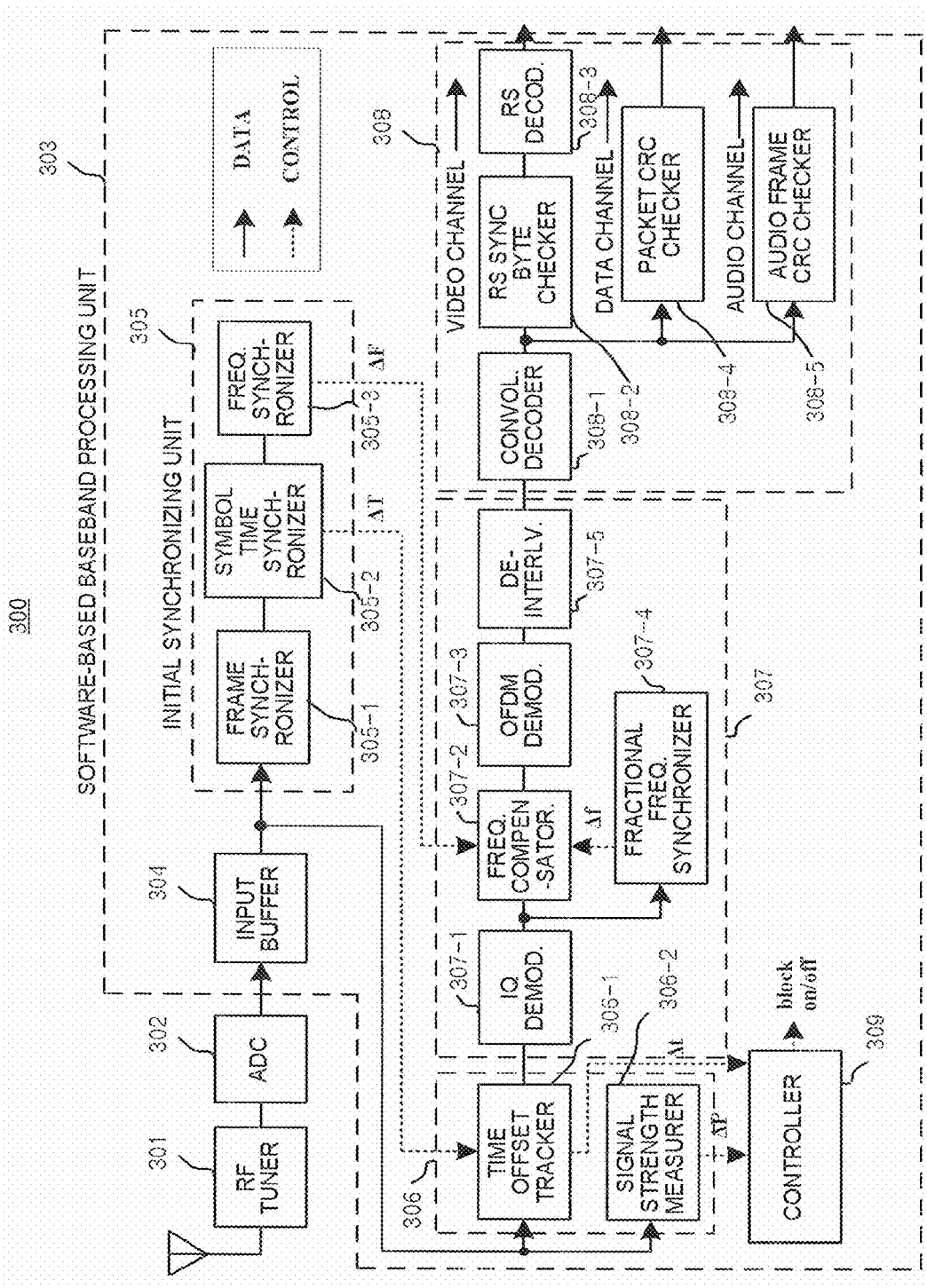
FIG. 3 is a block diagram of a software-based T-DMB receiver according to an embodiment of the present invention.

FIG. 3 is a block diagram of a software-based T-DMB receiver 300 according to an embodiment of the present invention.

The software-based T-DMB receiver 300 according to the embodiment of the present invention comprises an RF tuner 301, an analog-to-digital converter (ADC) 302 and a baseband processing unit 303. Here, the baseband processing unit 303 comprises an input buffer 304, an initial synchronizing unit 305, a frame tracking unit 306, an OFDM signal demodulating unit 307, a channel decoding unit 308 and a controller 309.

The input buffer 304 buffers a digital signal received from the ADC 302 and provides the buffered signal to the initial synchronizing unit 305 and the frame tracking unit 306.

The initial synchronizing unit 305 comprises a frame synchronizer (305-1), a symbol time synchronizer (305-2), and a frequency synchronizer (305-3). The initial synchronizing unit 305 estimates time and frequency offsets using a null symbol and a phase reference symbol (PRS) and compensates for the estimated lime and frequency offsets.

The frame tracking unit 306 comprises a time offset tracker (306-1) tracking the time offset of the signal inputted from the input buffer 304 and a signal strength measurer (306-2) measuring the strength of the signal inputted from the input buffer 304.

The OFDM signal demodulating unit 307 comprises an I/Q demodulator (307-1), a frequency compensator (307-2), an OFDM demodulator (307-3), a fractional frequency synchronizer (307-4) and a de-interleaver (307-5). The OFDM signal demodulating unit 307 performs I/Q demodulation, frequency compensation, OFDM demodulation and de-inter leaving with respect to a signal transmitted from the frame tracking unit 306.

The channel decoding unit 308 convolution decoder (308-1), RS sync byte checker (308-2), RS decoder (308-3), packet CRC checker (308-4), audio frame CRC checker (308-5). The channel decoding unit 308 performs convolution decoding and Read-Solomon decoding and performs a process of checking RS sync bytes and CRC of audio and data.

The controller 309 controls the initial synchronizing unit 305, the frame tracking unit 306, the OFDM signal demodulating unit 307 and the channel decoding unit 308 and determines their operations.

Figure 4:
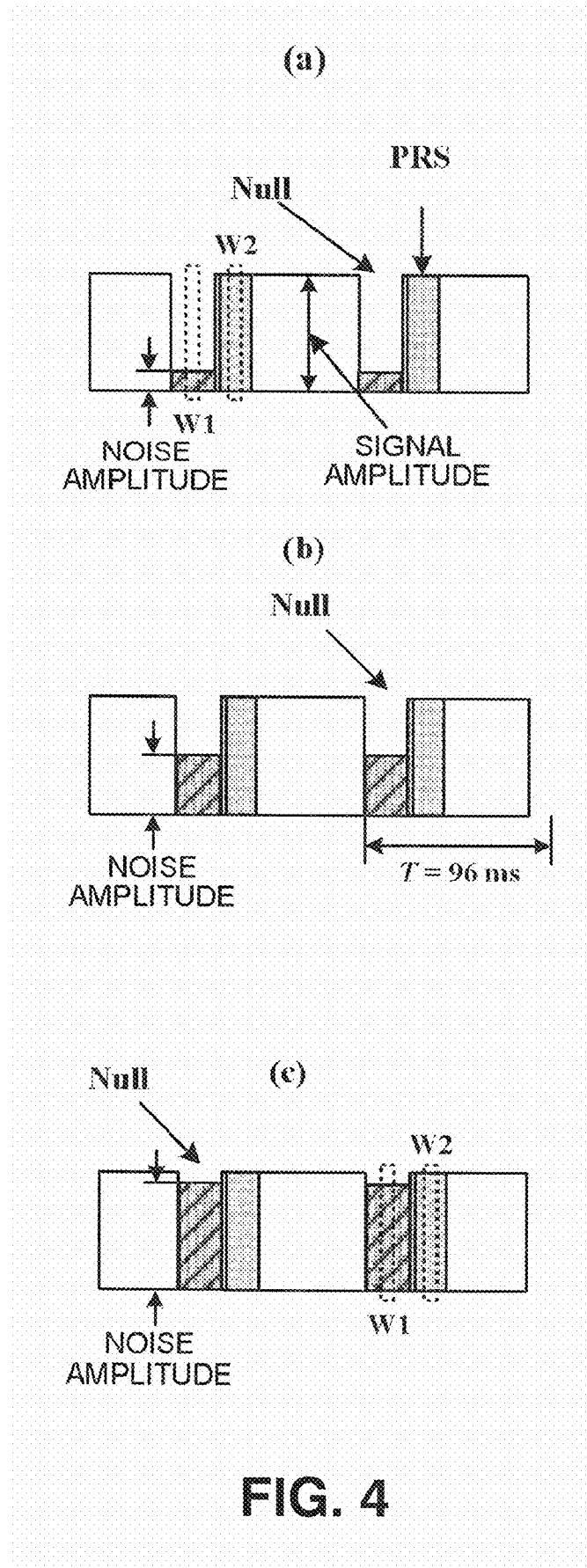
FIG. 4 is a conceptual view illustrating a method of measuring the strength of an input signal using a signal strength measurer included in the frame tracking unit.

FIG. 4 is a conceptual view illustrating a method of measuring the strength of an input signal using a signal strength measurer included in the frame tracking unit 306.

The strength of an input signal is measured using a signal strength ratio of a null symbol and a PRS in each frame. In the present invention, the reason why the strength of the input signal is measured using such a method is as follows: First, the start point of a frame is not exactly determined by received signal strength indication (RSSI) information measured by an RF timer, and the RSSI is a mean value measured throughout several frames, so that it is difficult to measure the strength of each frame using the RSSI information. Second, although the strength of the input signal is well measured by the RF tuner, operations of periodically checking and reading the measured strength every frame imposes a heavy burden on DSP for high-speed data processing. Since AGC included in the RF tuner maintains an output signal of the RF tuner to have certain amplitude, the DSP cannot measure the exact strength of an input signal. However, since a null symbol period having no signal exists every frame in a T-DMB transmission signal, variation in strength of the input signal can be estimated using variation in the amplitude of the null symbol. If the strength of the input signal is gradually increased, the gain of the AGC is gradually decreased to allow the strength of the output signal of the RF timer to be maintained constant, and accordingly, a noise signal passing through the AGC is gradually decreased. Since only the noise signal exists in the null symbol period, the amplitude the noise signal in the null symbol is gradually decreased as shown in (a) of FIG. 4. Accordingly, the signal strength ratio of the null symbol and the PRS is increased, so that the strength of the input signal can be considered increased. On the contrary, if the strength of the input signal is decreased, the amplitude of the null symbol is increased as shown in (b) of FIG. 4, so that the signal strength ratio of the null symbol and the PRS is decreased. If the strength of the input signal is considerably decreased in a shadow area, the gain of the AGC is maximized. Accordingly, the strength of the noise signal at the null symbol is considerably increased as shown in (c) of FIG. 4, and the signal strength ratio almost approximates to 1.

$$FPR_n = \frac{\sum_{m=P1}^{P2} x_m^2(m)}{\sum_{m=N1}^{N2} x_m^2(m)} \quad (1)$$

A process for measuring the strength of an input signal is expressed by Expression 1. Here, $x_m(m)$ denotes an input signal of an n-th frame, and N1 and N2 denote start and end points of a window W1 positioned in a null symbol period, respectively P1 and P2 denote start and end points of a window W2 positioned in a PRS period, respectively. In the present invention, the signal strength ratio at the n-th frame, measured by Expression 1, is referred to as $FPR_n$.

Figure 5:
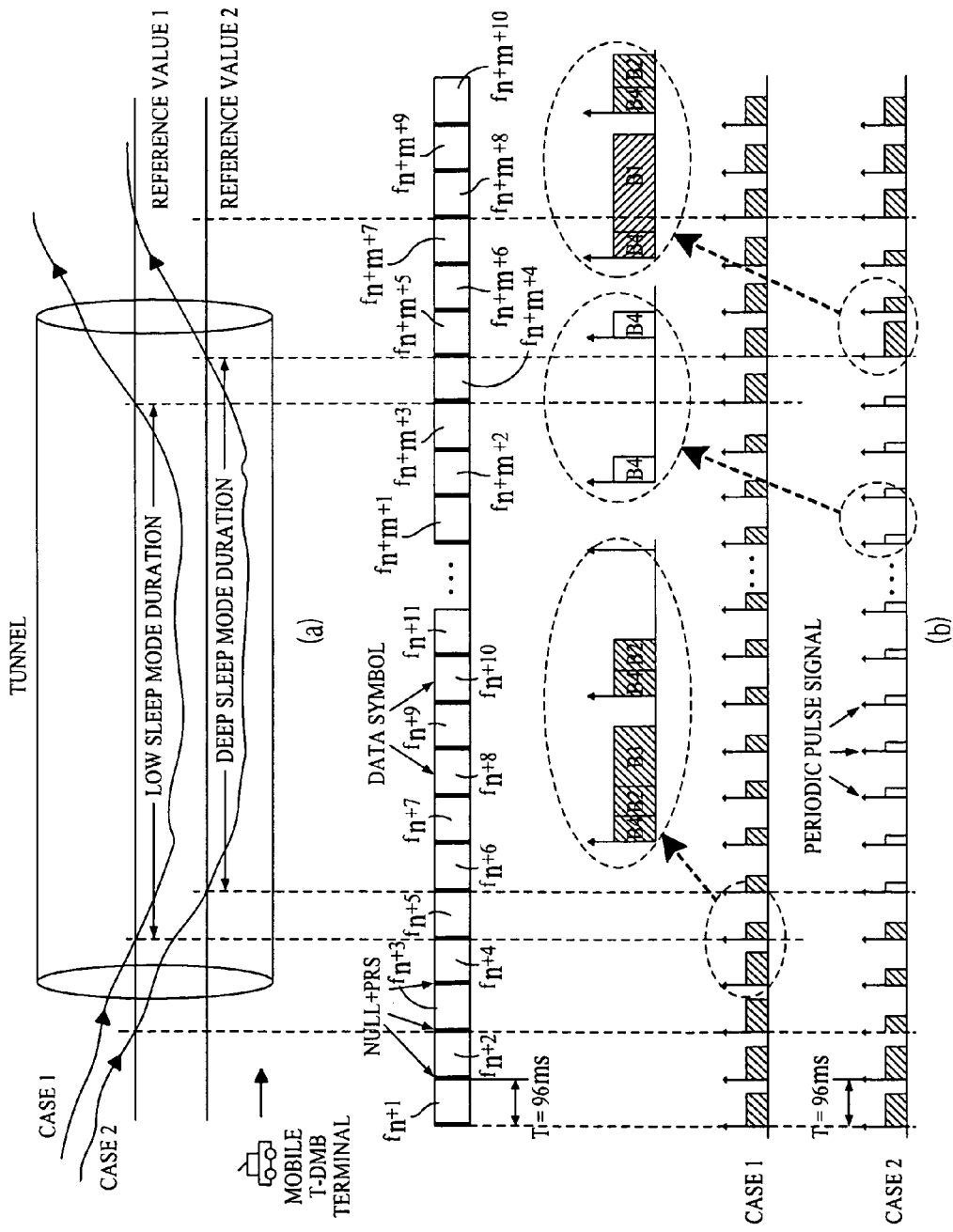
FIG. 5 is a view illustrating the operation of the software-based T-DMB receiver according to the embodiment of the present invention.

FIG. 5 is a view illustrating the operation of the software-based T-DMB receiver according to the embodiment of the present invention.

In FIG. 5, a first reference value denotes the strength of an input signal corresponding to sensitivity of the receiver, and a second reference denotes the strength of an input signal in which synchronization is not properly performed.

That is, when the strength of the input signal exists between the first and second reference values, the synchronization is performed. However, it is not assured that there is no error in the result of a demodulating process. When the strength of the input signal is lower than the second reference value, the synchronization is not properly performed.

B1 to B4 denote respective functional blocks of the T-DMB receiver. B1 is the initial synchronizing unit 305, B2 is the OFDM signal demodulating unit 307, B3 is the channel decoding unit 308, and B4 is the frame tracking unit 306.

In Case 1, before the receiver enters into a tunnel, FPR is greater than the first reference value. At this time, since data demodulation is smoothly performed, all the functional blocks (B2, B3 and B4) except the initial synchronizing unit 305 (B1) are operated. In FIG. 5, B4, B2 and B3 described at an enlarged portion of the time axis for Case 1 means that the frame tracking unit 306 (B4), the OFDM signal demodulating unit 307 (B2) and the channel decoding unit 308 (B3) is sequentially operated.

However, as the receiver enters into the tunnel, FPR is smaller than the first reference value, and the strength of the input signal is greater than the second reference value. For this reason, it is determined whether or not the channel decoding unit 308 is operated depending on the value of FPR and signal quality, which will be described in detail later. In FIG. 5, it is assumed that the channel decoding unit 308 is not operated while the receiver exists in the tunnel. In FIG. 5, B4 and B2 is described at an enlarged portion of the time axis for Case 1, which means that the channel decoding unit 308 (B3) is not operated, but the frame tracking unit 306 (B4) and the OFDM demodulating unit 307 (B2) are sequentially operated.

In the present invention, when channel decoding is not performed due to the degradation of signal quality is referred to as a "low sleep mode". While the receiver gets out of the tunnel, FPR is again greater than the first reference value, and quality of a channel-decoded signal is improved, so that the receiver gels out of the low sleep mode In Case 2, as the receiver enters into the tunnel, FPR exists between the first and second reference values. Like Case 1, it is determined whether or not the channel decoding unit 308 is operated depending on the value of FPR and signal quality. However, if the strength of the input signal is decreased smaller than the second reference value, only the frame tracking unit 306 (B4) is operated. In FIG. 5, only B4 is repeated at an enlarged portion of the time axis for Case 2, which is referred to as a "deep sleep mode". When the receiver is in the deep sleep mode, only the frame tracking unit 306 (B4) for checking the strength of an input signal and the positions of multiple paths is performed.

If FPR is greater than the second reference value as the receiver approaches the end of the tunnel, time and frequency arc synchronized by performing initial synchronization.

In the structure of the conventional T-DMB receiver, when the receiver is in the low sleep mode, the data demodulating unit 206 is operated. When the receiver is in the deep sleep mode, the initial synchronizing unit 205 is repeatedly operated. As described above, the largest amount of calculation is occupied by the initial synchronizing process and the channel decoding process. Therefore, in the structure of the convention T-DMB receiver, power consumption is serious in a shadow area.

Figure 6:
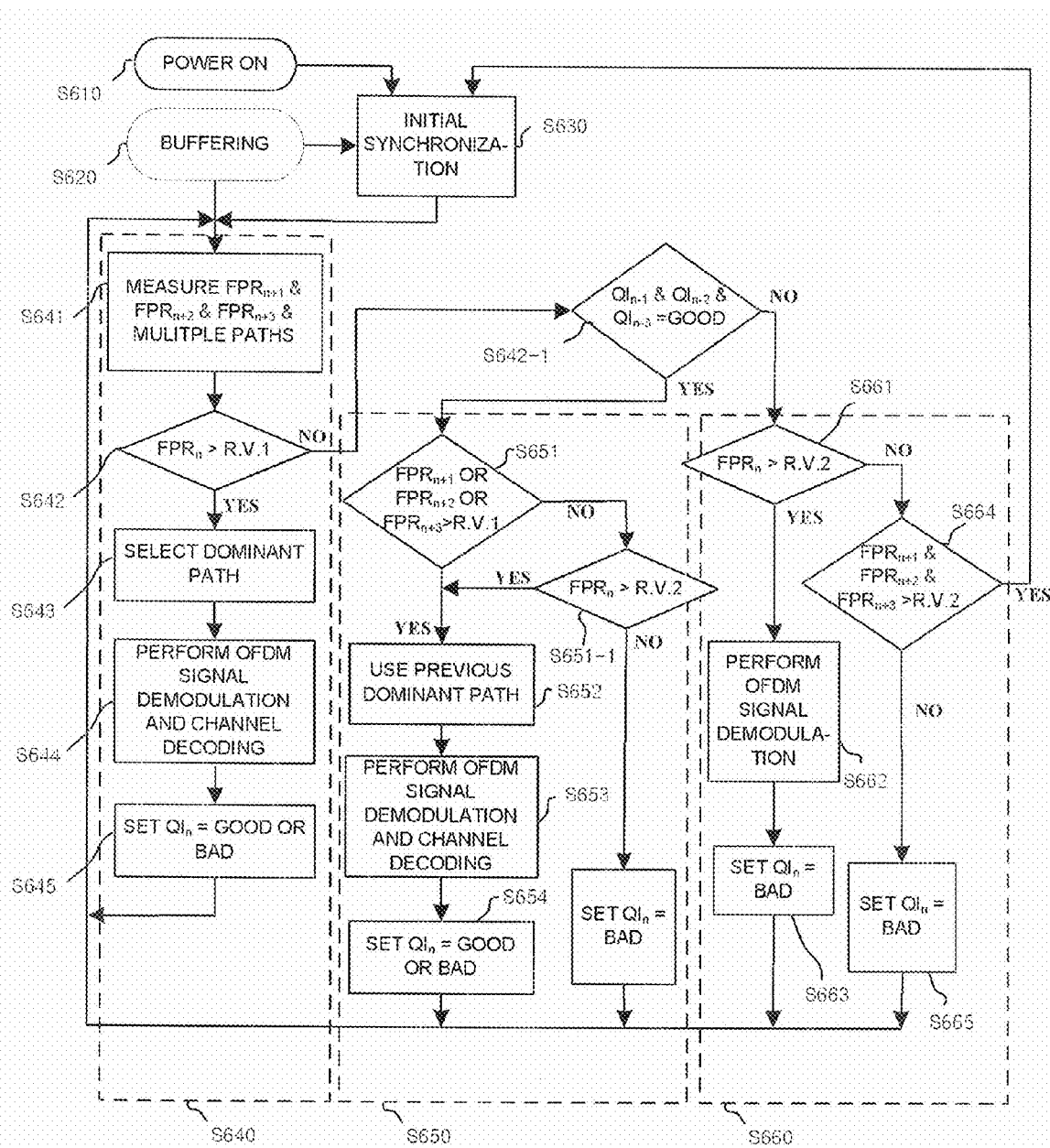
FIG. 6 is a flowchart illustrating a method of operating the T-DMB receiver according to the embodiment of the present invention.

FIG. 6 is a flowchart illustrating a method of operating the T-DMB receiver according to the embodiment of the present invention. The method of operating the T-DMB receiver is controlled by the controller 309.

When the T-DMB receiver starts operation (S610), a signal is first inputted to the input buffer 304 (S620), and initial synchronization is then performed by the initial synchronizing unit 305 (S630).

Thereafter, a main demodulating process (S640), a deep fading and low sleep process (S650), a deep sleep process (S660) are performed on a case by case basis.

When the main demodulating process (S640) is started, the controller 309 measures $FPR_{n+1}$, $FPR_{n+2}$, $FPR_{n+3}$ and multiple paths (S641). Subsequently, the controller 309 compares $FPR_n$ with the first value (S642). If the $FPR_n$ is greater than the first reference value, the controller 309 selects a dominant path estimated by the frame tracking unit (S643) and performs an OFDM signal demodulating process and a channel decoding process based on the dominant path (S644). The controller 309 determines signal quality Q1 based on the result of the channel decoding process (S645).

At this time, the reference for determining Q1 is as follows: In the channel decoding process, the controller 309 checks RS sync bytes or CRC of packet or audio signals after a convolution decoding process. At this time, if half or more decoding errors determined in a signal arc generated, the signal quality Q1 after the convolution decoding process is determined to be "bad".

In step S642, if the $FPR_n$ is smaller than the first reference value, it can be determined as one of the following three cases:

A first case is when the strength of the input signal of a current frame is rapidly decreased. A second case is a low sleep mode. A third case is a deep sleep mode.

In the present invention, unnecessary processes are not performed suitable for the respective cases, so that power consumption can be reduced. For this reason, if it is determined that FPR is smaller than the first reference value, the controller 309 determines which terminal corresponds to one of the three cases.

Accordingly, the controller 309 checks signal qualities of predetermined numbers (for example, three) of previous frames $Q_{n-1}$, $Q_{n-2}$ and $Q_{n-3}$ (S642). If the signal qualities are all "good", it is determined as a deep fading or low sleep mode, and the controller 309 proceeds to step S650. Otherwise, it is determined as a deep sleep mode, and the controller 309 proceeds to step S660.

In step S650, the controller 309 measures the strength of the input signal in the frame stored in the input buffer. If the signal strength $FPR_{n+1}$, $FPR_{n+2}$ or $FPR_{n+3}$ of an input signal inputted in a subsequent frame is greater than the first reference value (S651), the controller 309 determines that the strength of the input signal in the current frame is decreased and uses a dominant path of the previous frame (S652). Then, the controller 309 performs a data demodulating process and a channel decoding process using the dominant path (S653) and determines the signal quality of the current frame in the channel decoding process (S654).

At step S651, if the strength $FPR_{n+1}$, $FPR_{n+2}$ or $FPR_{n+3}$ of the input signal stored in the input buffer is smaller than the first reference value, the controller 309 compares the strength $FPR_n$ of the input signal in the current frame with the second reference value (S651-1). If the $FPR_n$ is greater than the second reference value, the controller 309 checks the signal quality through the demodulating process using the dominant path of the previous frame (S652, 653 and S654). This is because a high-quality signal may be obtained due to the performance of channel decoding even in the low sleep mode.

However, if the strength of the input signal of the frame in the slow sleep mode is smaller than the second reference value, the controller 309 does not perform the demodulating process and sets the signal quality of the current frame to be "bad" (S655). Then, the controller 309 performs processing of a next frame.

If the strength of the input signal in the current frame is smaller than the first reference value at step S642 and bad signal qualities exists in data in the previous frame at step S642-1, the controller 309 proceeds to step S660 and determines whether or not the $FPR_n$ is greater than the second reference value (S661). This is because the receiver may be in a deep sleep mode. If the strength of the input signal in the current frame is greater than the second reference value, data having bad signal quality in the previous frame has an influence on several frames due to the influence of the de-interleaver. Therefore, correct data arc not demodulated although the channel decoding process is performed. For this reason, the controller 309 performs only the OFDM signal demodulating process (S662) and sets the signal quality of the current frame to be "bad" (S663). Then, the controller 309 performs processing of a next frame. At step S661, if the FPR of the input signal in the current frame is smaller than the second reference value, it is determined as a deep fading mode, and the controller 309 measures signal strengths $FPR_{n+1}$, $FPR_{n+2}$ and $FPR_{n+3}$ in the next frame stored in the input buffer. If subsequent signal strengths $FPR_{n+1}$, $FPR_{n+2}$ and $FPR_{n+3}$ in the next frame inputted to the input buffer are smaller than the second reference value (S664), the signal quality of the current frame is set to be "bad" (S665) and performs processing of a next frame without a data process. This is because the receiver is still in the deep sleep mode. However, if the strength of the input signal in a subsequent frame is greater than the second reference value (S664), the controller 309 performs estimation of time and frequency offsets through the initial synchronizing process. This is because the receiver gets out of the deep sleep mode.

In the specification, when two signals to be compared with each other have the same amplitude, it does not matter that any one of two cases where one of the two signals is greater than the other, which will fall within the scope of the present invention.

In the T-DMB receiver according to the embodiment of the present invention, when a signal lower than sensitivity is inputted due to the T-DMB receiver positioned in a tunnel or a shadow area between high-rise buildings, the receiver dose not perform unnecessary processes, thereby saving power consumption.

To this end, the frame tracking unit 306 measures the strength of an input signal every frame and estimates multiple paths, thereby selecting a dominant path. The controller 309 determines the status of a current receiver through the algorithm proposed in the present invention using the dominant path and properly determines blocks to be performed among the initial synchronizing unit 305, the OFDM signal demodulating unit 307, the channel decoding unit 308 and the frame tracking unit 306.

In such a method, the controller has many cases to be considered as compared with the structure of the convention software-based T-DMB receiver. However, when the receiver enters into a shadow area, the method prevents the channel decoding unit or the initial synchronizing unit from be unnecessarily performed, so that power consumption can be considerably reduced. Further, the power consumption of the receiver can be considerably saved even at a place such as a metropolis having many shadow areas or an area at which the strength of an input signal is not high.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, the scope of the present invention should be understood within the scope of the present invention defined by the appended claims.

What is claimed is:

1. An apparatus for receiving a T-DMB signal, comprising:
an input buffer receiving and buffering a T-DMB signal comprising a null symbol and a phase reference symbol (PRS);
an initial synchronizing unit estimating and compensating for time and frequency offsets of the T-DMB signal using the null symbol and the PRS;
a frame tracking unit performing estimation of the time offset and measurement of the strength of an output signal from the input buffer;
an OFDM signal demodulating unit performing I/Q demodulation, frequency compensation, OFDM demodulation and de-interleaving with respect to an output signal of the frame tracking unit;
a channel decoding unit performing channel decoding with respect to an output signal of the OFDM signal demodulating unit and determining quality of the channel-decoded signal; and
a controller controlling operations of each of the initial synchronizing unit, the OFDM signal demodulating unit and the channel decoding unit based on the strength of the signal measured by the frame tracking unit and the quality of the signal determined by the channel decoding unit.

2. The apparatus of claim 1, wherein the frame tracking unit measures the strength of the signal using a strength ratio of the null symbol and the PRS.

3. The apparatus of claim 1, wherein the channel decoding unit determines the quality of the channel-decoded signal using RS sync bytes and CRC of a package or audio signal.

4. The apparatus of claim 1, wherein the controller determines operations of each of the initial synchronizing unit, the OFDM signal demodulating unit and the channel decoding unit by comparing the strength of the signal measured by the frame tracking unit with predetermined first and second reference values.

5. A method of operating an apparatus for receiving a T-DMB signal, comprising:
receiving and buffering a T-DMB signal comprising a null symbol and a PRS;
estimating and compensating for time and frequency offsets of the T-DMB signal using the null symbol and the PRS;
measuring the time offset and a signal strength of the T-DMB signal, which is varying with time, using the T-DMB signal having the compensated time and frequency offsets;
performing OFDM signal demodulation and channel decoding with respect to the T-DMB signal and measuring quality of the channel-decoded signal when the strength of the T-DMB signal is greater than a predetermined first reference value or when the strength of the T-DMB signal is smaller than the first reference value due to deep fading;
performing OFDM signal demodulation and channel decoding and measuring quality of the channel-decoded signal when the quality of all of the predetermined numbers of previous frames of the T-DMB signal are determined to be "good" and the strength of the T-DMB signal is greater than a predetermined second reference value;
performing OFDM signal demodulation when the quality of some of the predetermined numbers of previous frames of the T-DMB signal is determined to be "bad" and the strength of the T-DMB signal is greater than a predetermined second reference value; and
estimating the time offset of the T-DMB signal and measuring the strength of the T-DMB signal when the strength of the T-DMB signal is smaller than the second reference value.

6. A computer-readable receding medium in which computer program for performing the respective operations in the method according to claim 5 is recorded.

* * * * *